United States Patent [19]
Nakamura

[11] 3,828,382
[45] Aug. 13, 1974

[54] METHOD OF MANUFACTURING A FASTENER SUCH AS A BOLT, RIVET, OR THE LIKE

[75] Inventor: Yoshio Nakamura, Tokyo, Japan

[73] Assignee: Toyo Purasu Sukuryu Kabushiki Kaisha (Toyo Plus Screw Co., Ltd.), Kanagawa-Ken, Japan

[22] Filed: May 4, 1971

[21] Appl. No.: 140,093

[30] Foreign Application Priority Data
May 6, 1970  Japan.............................. 45-37932

[52] U.S. Cl............................................. 10/27 R
[51] Int. Cl............................................. B21k 1/46
[58] Field of Search............ 10/2, 10 R, 11 R, 27 R, 10/86 R, 86 F, 155 R; 85/9 R, 9 W, 37

[56]     References Cited
UNITED STATES PATENTS
469,261    2/1892    Moran................................. 10/27 R
1,382,052  6/1921    Birrell................................ 10/27 R
1,435,586  11/1922   Collette.............................. 10/27 R
1,448,873  3/1923    Searles............................... 10/27 R
1,688,423  10/1928   Jardine............................... 10/27 R
2,609,550  9/1952    Phipard.............................. 10/27 R
2,914,780  12/1959   Poupitch............................. 10/27 R FOREIGN PATENTS OR APPLICATIONS
116,313    6/1918    Great Britain..................... 10/27 R
1,040,322  1/1954    Germany............................ 10/27 R Primary Examiner—Charles W. Lanham
Assistant Examiner—E. M. Combs
Attorney, Agent, or Firm—Steinberg & Blake

[57]  ABSTRACT

A method of manufacturing a fastener such as bolt, rivet and the like having an integrated flange on the head. The flange may be made of any metal and in any form, but must have a central flat part where it is integrated with the head. The head is two stage cold headed. After a first flowing cold heading, the head is inserted into an opening in the central flat part of the flange and finishing cold headed simultaneously with the integration of the flange on the head so that flow of structure of the head partly surrounds the part of the flange received in the head.

13 Claims, 21 Drawing Figures

PATENTED AUG 13 1974 3,828,382
SHEET 1 OF 2
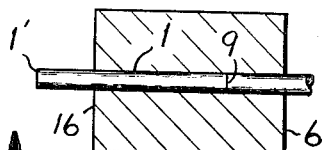
Fig.1A
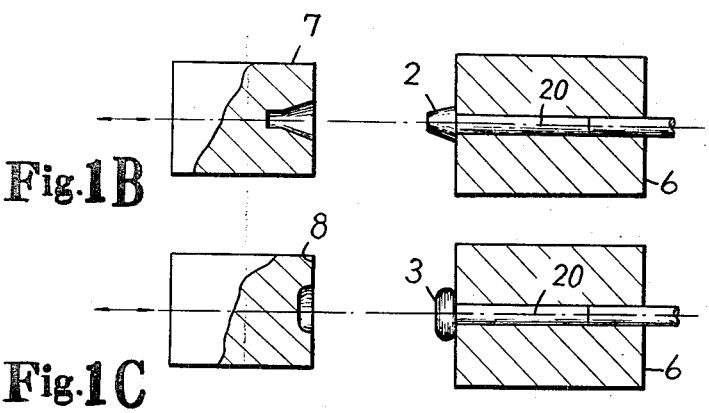
Fig.1B
Fig.1C
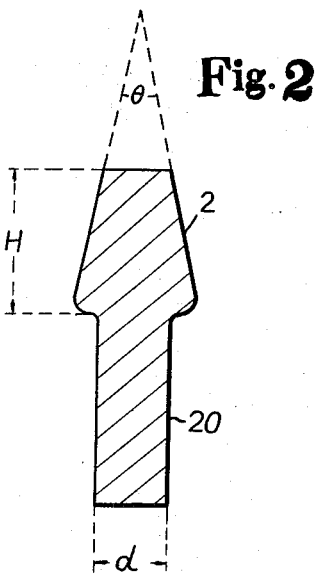
Fig.2
Fig.3
Fig.1D
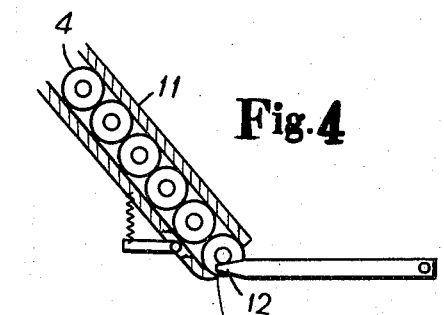
Fig.4
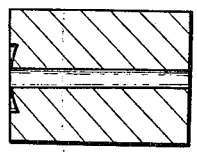
Fig.1E
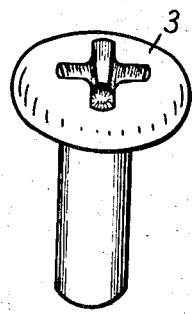
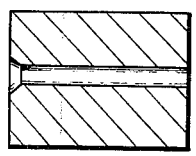
Fig.1F
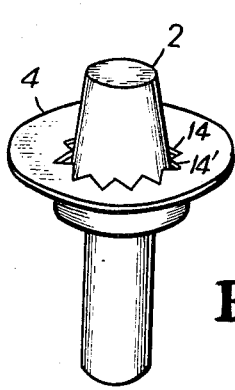
Fig.5
INVENTOR.
YOSHIO NAKAMURA
BY Steinberg & Blake
attys

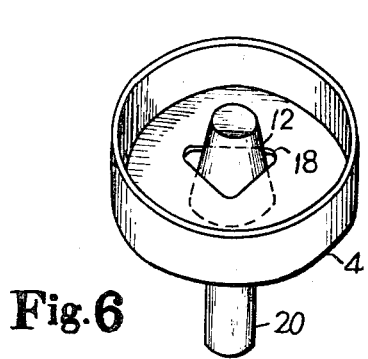
Fig.6
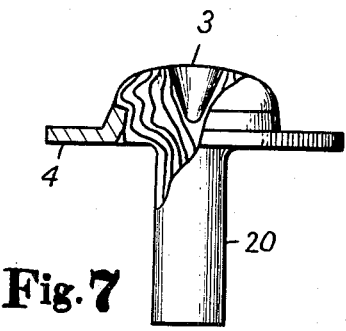
Fig.7
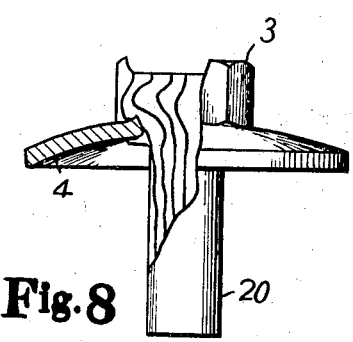
Fig.8
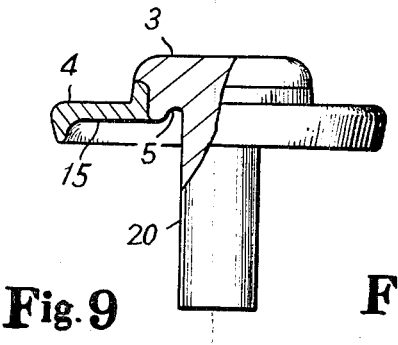
Fig.9
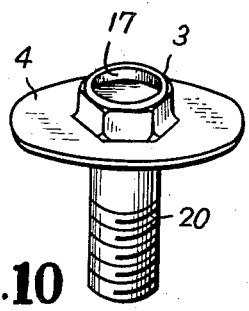
Fig.10
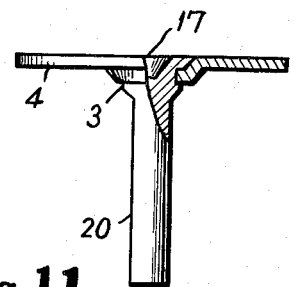
Fig.11
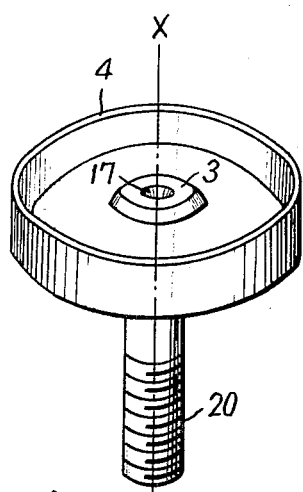
Fig.12
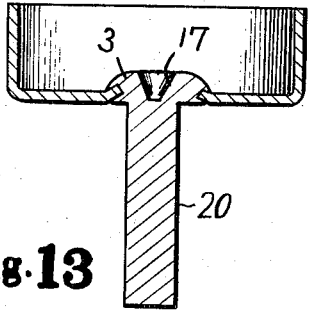
Fig.13
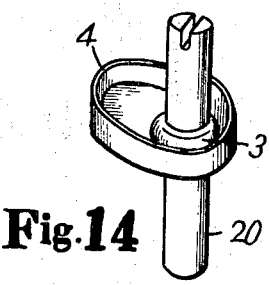
Fig.14
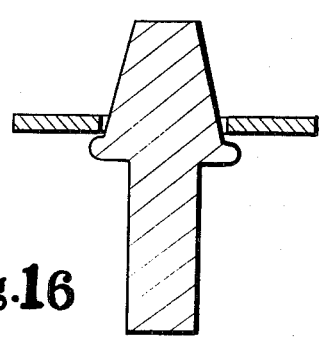
Fig.15
Fig.16

METHOD OF MANUFACTURING A FASTENER SUCH AS A BOLT, RIVET, OR THE LIKE

BACKGROUND OF THE INVENTION

This invention relates to improvements in a fastener or securing member such as bolt, rivet, machine screw and the like and particularly to those having a flanged head, and a method of forming the same.

In general, a securing member of the class described, having a standardized size is formed from a length of wire by cold heading in a header or a kind of two stage automatic cold forging machine. However, the conventional method is limited by size and shape of the head. It is impossible to form a head larger than a standardized size or having a specified shape insofar as the conventional method is used. In order to forcibly overcome the limit, it is required to depend upon any of multiple stage cold forging, hot forging, machining, or the like. However, these methods are disadvantageous due to low productivity and expensiveness of machines therefor, and, in addition, even by these methods, it is impossible to form some required securing members as the case may be.

Meantime, it is a generally known procedure to arrange a washer on a bearing surface of a head of a standardized fastener for enlarging the surface and to use a spring washer for preventing looseness. To these ends, a screw preassembled with a washer has been known, in which the washer has been arranged on the bearing surface of the head of the screw and thereafter the screw has been formed by rolling so as to achieve an improvement in workability. In this case, the washer is fed manually or by a specified means before the screw is rolled. However, the last-named method is demeritorious in productivity and disadvantageously requires a stage for checking non-conforming products so that it is not practically broadly useful.

The primary object of this invention is to provide a securing member having a flanged head, of which the flange is larger than a standardized size.

Another object of this invention is to provide a method of forming the securing or fastener member of the class described, overcoming the above-mentioned drawbacks in the conventional methods in accordance with the prior art.

Still another object of this invention is to provide a securing member having a flanged head for substituting for the conventional screw preassembled with a washer, but having better quality and being less expensive than the conventional one.

Yet another object of this invention is to provide a securing member having a flanged head, of which the flange is made of another metal so as to render the flange more electrically conductive and more corrosion resistant than the head.

Further another object of this invention is to provide a securing member having a flanged head, of which the flange is abnormally shaped so as to satisfy various requirements for constructing divers machines.

SUMMARY OF THE INVENTION

Briefly stated in accordance with one aspect of this invention, there is provided a fastener such as bolt, rivet and the like, comprising a head, a shank, and a flange of a metal. The flange has a central flat part and the head is integrated with the central flat part by cold heading to form an integral flanged head, into which at least partly the central flat part extends, and having flow of structure partly surrounding the part of the central flat part received therein.

In accordance with this invention, a method of forming the above securing member is also provided, in which a blank for the head radially integrated with the shank is first flowing cold headed into a conical head. The first flowing cold headed blank or the conical head is engaged with another blank for the flange or a flange blank by inserting the former into an opening formed in the central flat part of the latter, and the conical head engaged with the flange blank is finish cold headed so that flow of structure of the head partly surrounds the part of the central flat part received into the head. The above opening may have a serrated inner periphery. A downward opened annular groove may be formed in the bearing surface of the head coaxially with the shank.

BRIEF DESCRIPTION OF THE DRAWING

The invention will be better understood and other objects and additional advantages of the invention will become apparent upon perusal of the following description taken in connection with the drawings, in which:

FIG. 1A is a diagrammatic view of the starting stage of the cold heading operation;

FIG. 1B is a diagrammatic view of the first flowing stage thereof;

FIG. 1C is a diagrammatic view of the second flowing or finish cold heading operation;

FIGS. 1D, 1E and 1F are diagrammatic views of modified dies for the cold heading operation, respectively;

FIG. 2 is an axially sectional view of a first flowing cold headed blank;

FIG. 3 is a perspective view of a cross recessed pan headed securing member cold headed in the conventional manner from the blank shown in FIG. 2;

FIG. 4 is a schematic view of a part of a machine for forming the securing member embodying this invention;

FIG. 5 is a perspective view of the first flowing cold headed blank as shown in FIG. 2, which is then inserted into an opening of another blank for the flange;

FIG. 6 is a perspective view similar to FIG. 5, but the opening is of a substantially triangular form;

FIG. 7 is a partly axially sectional side elevational view of a securing member embodying this invention, in which flow of structure is illustrated;

FIG. 8 is a partly axially sectional side elevational view of another embodiment in accordance with this invention, in which also flow of structure is illustrated;

FIG. 9 is a partly sectional side elevational view of still another embodiment in accordance with this invention, which is provided with a downward opened annular groove in the bearing surface of the head;

FIG. 10 is a perspective view of the second embodiment in accordance with this invention shown in FIG. 8;

FIG. 11 is a partly axially sectional side elevational view of the fourth embodiment in accordance with this invention;

FIG. 12 is a perspective view of the fifth embodiment in accordance with this invention;

FIG. 13 is an axially sectional view of the securing member shown in FIG. 12;

FIG. 14 is a perspective view of the sixth embodiment in accordance with this invention; and FIGS. 15 and 16 are axially sectional views of semi-manufactures in accordance with this invention, in which modified blanks are shown, respectively.

Similar numerals refer to similar parts throughout the several views.

DESCRIPTION OF THE PREFERRED EMBODIMENTS

Reference is now made to FIGS. 1A, 1B and 1C illustrating the operation stages of the securing member formation by cold forging. In general, a head of a securing member in accordance with prior art is cold headed by an automatic two stage press header. At first a steel wire is straightened and cut into a required length 1, which is placed in a die 6. One end 9 of the length 1 is held in place and the other end 1' extended out of the die 6 is preliminarily cold forged into a preliminary head or conical head 2 by a first or conical punch 7, (which is generally operated by a crank), as shown in FIG. 1B and FIG. 2. Then the punch 7 is withdrawn leftward in FIG. 1B and instead thereof a finishing punch 8 is brought into operation in the same position with the punch 7 so as to form a final head 3 by cold forging as shown in FIG. 1C and FIG. 3. Thus in accordance with prior art, formation of a head 3 of a securing member is made in a two stages operation. This two staged opertion is not absolutely necessary in accordance with the prior art, while such a two staged operation is absolutely necessary in the method of forming a securing member in accordance with this invention.

In accordance with this invention, an automatic press which cold forges a head of a securing member in a two staged operation, is used. Meantime, another blank or a flange blank 4 of a metal for the flange is preliminarily formed by another press and the like. In this case an opening 14 is formed in a central flat part, which will be referred to in detail hereinafter. A chute 11 is lined up with the preliminarily formed flange blanks 4 by a lining up means as shown in FIG. 4. The flange blank 4 is intermittently advanced to an end thereof in synchronism with operation cycle of the automatic press, from whence it is taken out of the chute 11 by a transfer finger 12, brought on the preliminary or first flowed conical head 2 extended out of the die 6 of the automatic press similarly synchronously, and engaged with the conical head 2 so that the latter is inserted into the opening 14 formed in the flange blank 4 as shown in FIGS. 5 and 6. Then the conical head 2 is finish cold forged into a finished head 3 corresponding to the operation shown in FIG. 1C, while the flange blank 4 is integrated with the conical head 2 by the finishing cold forging operation so as to form a flanged head 3.

In accordance with this invention, the securing member may be modified into a good number of embodiments as exemplified in FIGS. 6, 7, 8, 9, 10, 11, 12, 13 and 14. The variety consists mainly in the shape of the flange. Such a specified flange is preliminarily formed before the flange blank 4 is lined up on the chute 11. Whatever the shape of the flange blank 4 is, it must have a central flat part and an opening 14 therein. The conical head 2 of the blank is inserted into the opening 14 and the former is integrated with the latter by the second flowing or finish cold heading operation simultaneously thereto. In this case flow of structure of the conical head 2 is changed so as to partly surround the inner periphery of the opening 14 of the flange blank 4, by virute of the second flowing operation, as shown in FIGS. 7 and 8, while the corresponding flow does not make such a detour in the absence of the flange blank 4. In view of this, cold forging the conical head 2 into the finished head 3 simultaneously with integration of head 2 with the flange blank 4 is absolutely necessary.

In accordance with this invention, a downward opened annular groove 5 may be formed in the bearing surface 15 of the head 3 for facilitating to render the flow of structure roundabout. The annular groove 5 should be formed in the preliminary cold heading or first flowing stage and arranged coaxially with and close to the shank 20 as shown in FIG. 9. To this end an annular rib may be provided in the surface 16 of the die 6 as shown in FIG. 1D.

In case a warped flange is required as shown in FIG. 8, such a die as shown in FIG. 1E and a corresponding punch are to be used.

In accordance with this invention, the inner periphery of the opening 14 of the flange blank 4 may have various effective shapes. Primarily the opening 14 is round. The round opening 14 may have a serrated inner periphery 14' as shown in FIG. 5. The number of the internally protruded teeth is at least three and such a three-toothed opening is relatively advantageous. Meantime, the inner periphery of an opening shown in FIG. 6 has a substantially triangular form 18. A radially in constant opening as in the above examples is effective for integrating the flange blank 4 with the conical head 2.

Furthermore, it is also preferred to form a hub in the flange blank 4 coaxially with the opening 14. In this connection, the flange blank 4 may advantageously have a ribbed inner periphery as shown in FIG. 15. The frustro-conical head 2 also may have an annular radial rib along the bottom end thereof as shown in FIG. 16, which may be formed by a special die and/or a special punch. A chamferred die as shown in FIG. 1E is required for forming a securing member having a downward hub, for example, as shown in FIG. 11. Sometimes, it is facilitated by such a chamferred die to position a flange blank 4 on a conical head 2.

Thereafter, thread rolling and other operations may be subjected to the securing member, if necessary.

In case where the securing member is to be turned in the manner of a hexagon head bolt as shown in FIG. 10, a cross recessed screw and the like, it is more important to protect the securing member from separation of the flanged head from the shank. It was found by the inventor that the conical angle $\theta$ of the frustro-conical head 2 is to be from 15° to 25° and that it is preferable that a preliminary frustro-conical head 2 having a height $H$ is to be formed by the first flowing cold forging operation from a length $l$, from which a shank 20 having a diameter $d$ is to be formed simultaneously with the first flowing cold heading in such a relation of $H$ to $d$ as $$H = (\text{from } 1.4 \text{ to } 2.5)\ d;$$

On the other hand, in case where the securing member has among its objects mainly to transmit a torsional torque between the flange 4 and the shank 20, as those shown in FIGS. 12, 13 and 14, the opening 14 should have a serrated inner periphery 14' and the conical angle θ of the preliminary frustro-conical head 2 is preferably from 12° to 20°. In such a case it was found by the inventor that it is preferable that the height H of the frustro-conical head 2 relates to the diameter d of the shunk 20 as follows:

$$H = (\text{from } 1.8 \text{ to } 2.8)\, d.$$

In addition, it is also preferred for such a case as above by the inventor that an axial recess 17 in a conical form or a comparable form thereto is cold forged on the outer central part of the finished head 3 coaxially with the shank 20 simultaneously with the integration of the flange 4 with the conical head 2 for facilitating the integration, as shown in FIGS. 8, 10, 11, 12 and 13.

Reference is now made to FIGS. 8 and 10 illustrating a cold headed hexagon head bolt integrated with a radially broad elastic disc flange. The flange 4 may be an orignally elastic dished disc. Upon formation of a required screw thread on the shank 20 suited for a nut (not shown), the flange 4 may be elastically deformed by screwing the nut so as to provide a locking effect. It is impossible to form such a specified head by the usual two staged cold heading or multiple staged cold heading.

Not only in the above case, but also in any of all embodiments having various appearances, it is possible to integrate a flange with a head of a metal different from the flange in accordance with this invention. A steel flange 4 was integrated with a head 3 of another steel in an embodiment described below.

A strength of the integration of the flange 4 with the head 3 in the securing member in accordance with this invention was experimentally exemplified by the embodiment as shown in FIGS. 8 and 10, in which the flange 4 was a disc of cold rolled steel plate having a thickness of 1.6 mm. and an outer diameter of 30 mm. The opening 14 thereof has an inner diamteter of 12.5 mm. and a three-toothed inner periphery. The head 3 and the shank 20 radially integrated therewith were made of S.A.E. 1012 steel. The finished head 3 was a hexagon having a diagonal line of 15 mm., with which the flange 4 was integrated. A screw thread having a designation of 8 mm. and a pitch of 1.25 mm. was formed on the shank 20.

When the shank 20 of the securing member was pulled in the axial screwing-in direction, using a jig having an opening having a diameter of 18.5 mm. (which is 3.5 mm. longer than 1.5 mm. of the diagonal line of the hexagon head) on the bearing surface of the head 3, a disintegration resistance of 950 kg. was measured. When the shank 20 was pushed in the reverse direction, another disintegration resistance of 450 kg. was measured. When the shank 20 was turned while the flange was fixed to be unturned, the shank 20 was broken while the integrating line between the flange 4 and the head 3 was not damaged at all by a breaking load of 260 kg./cm². In addition, when the bearing surface of the same sample was placed on another jig with an opening having a diameter of 10 mm. or less than the head 3 and the shank 20 was axially pulled, the shank 20 was broken by a breaking load of 1,500 kg., but the head, the flange and the combination thereof were not damaged at all. The above data show that the securing member having the flanged head in accordance with this invention is stronger than the corresponding 8 mm. screw conventionally made.

Reference is now made to FIG. 11 illustrating an automotive part, which is a securing member having an abnormally shaped flange 4 integrally cold forged with a head 3. Disintegration resistance thereof is ten times or more of that of a corresponding member which has been made from a conventional screw electrically spot welded with a plate.

Reference is now made to FIGS. 12 and 13, illustrating a sub-flanged flanged headed bolt. The sub-flanged of the flange 4 is provided for the manual screwing-in operation of the bolt. Conventional corresponding members have been assembled from two or more parts. By virtue of a high productivity of the securing member in accordance with this invention, it costs about one third of the known corresponding member.

Reference is now made to FIG. 14 illustrating a securing member having an eccentric disc integrally cold forged with a head, which is to be used in such a manner that a radially sensitive adjustment is effected by turning the shank 20, for example, by a screw driver, It is possible to mass-produce it with a high precision in accordance with this invention, while a corresponding member has been made by machining.

While particular embodiments of this invention have been illustrated and described, modifications thereof will readily occur to those skilled in the art. It should be understood therefore that the invention is not limited to the particular constructions and forms disclosed but that the appended claims are intended to cover all modifications which do not depart from the true spirit and scope of the invention.

What is claimed as new and desired to be secured by Letters Patent of the United States is:

1. In a method of manufacturing a fastener such as a bolt, rivet, or the like, the steps of cold forming one end region of an elongated shank into a head of frustoconical configuration having a circular cross section throughout its length and having at one end of said shank a free circular end surface of minimum area and between the ends of said shank an opposed end of maximum cross-sectional area greater than the cross-sectional area of the shank so as to define a shoulder projecting outwardly from the shank, inserting said frustoconical head into an opening defined by an inner peripheral region of a flange blank, with the latter opening being large enough to receive said end surface of minimum diameter but too small to receive the opposed end of said frustoconical head and with said opening having a non-circular configuration according to which the edge which defines said opening engages said frustoconical head at circumferentially spaced portions thereof with the edge portions of the opening which engage said frustoconical head being composed of straight edge portions, so that said flange blank engages said frustoconical head between the opposed ends thereof, and then finish cold forming said frustoconical head while axially compressing the latter and flowing the material thereof around said inner peripheral region of said flange blank which defines said opening thereof onto and against opposed faces of said flange blank and into the spaces between those portions of the edge which defines said opening which initially engage the exterior surface of frustoconical head, so as to integrate the flange blank with said shank while uniting the flange blank and shank not only by the pressure of the flowing material of the frustoconical head against the opposed faces of the flange blank to prevent relative axial movement between the flange blank and shank but also by the material of the frustoconical head which flows into the spaces of the opening between the edge regions thereof which initially engage the frustoconical head for providing in the opening of the flange blank a configuration of the shank which is of a non-circular configuration matching the non-circular configuration of the opening of the flange blank to prevent rotary movement between the flange blank and shank.

2. In a method as recited in claim 1 and wherein said inner peripheral region is of a substantially triangular configuration.

3. In a method as recited in claim 1 said inner peripheral region is of toothed configuration.

4. In a method as recited in claim 1 and wherein said frustoconical head has an axial length which is on the order of 1.4–2.5 times the diameter of said shank while said frustoconical head forms part of a cone whose apex angle is on the order of 15°–25°.

5. In a method as recited in claim 1 and wherein said frustoconical head has a length which is on the order of 1.8–2.8 times the diameter of said shank while said frustroconical head forms part of a cone whose apex angle is on the order of 12°–20°.

6. In a method as recited in claim 1 and wherein said opening of said flange blank is centrally situated therein.

7. In a method as recited in claim 1 and wherein said opening of said flange blank is non-centrally situated therein.

8. In a method as recited in claim 1 and wherein said finish-forming provides said head with a hexagonal configuration.

9. In a method as recited in claim 8 and wherein said hexagonal head is also formed with a recess at its outer free end.

10. In a method as recited in claim 1 and wherein said head is formed during the finish cold forming thereof with a central conical recess coinciding with the axis of said shank and contributing to the flow of the material of said head.

11. In a method as recited in claim 1 and wherein said flange blank is in the form of cup spring.

12. In a method as recited in claim 1 and wherein said flange blank is in the form of a flat washer.

13. In a method as recited in claim 1 and wherein said finish forming provides said head at the region where it projects radially from said shank with a groove surrounding said shank.

* * * * *